United States Patent
Graves et al.

(10) Patent No.: US 7,292,998 B2
(45) Date of Patent: *Nov. 6, 2007

(54) SYSTEM AND METHOD FOR ADDING VALUE TO A STORED-VALUE ACCOUNT

(75) Inventors: Phillip Craig Graves, Atlanta, GA (US); Merrill Brooks Smith, Atlanta, GA (US)

(73) Assignee: e2interactive, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/672,689

(22) Filed: Feb. 8, 2007

(65) Prior Publication Data

US 2007/0118478 A1 May 24, 2007

Related U.S. Application Data

(63) Continuation of application No. 10/739,301, filed on Dec. 19, 2003.

(60) Provisional application No. 60/519,630, filed on Nov. 14, 2003, provisional application No. 60/519,629, filed on Nov. 14, 2003.

(51) Int. Cl.
*G06Q 40/00* (2006.01)
(52) U.S. Cl. .............................. 705/44; 705/35; 705/37; 705/39; 235/375; 235/379; 235/380; 235/381; 235/382; 235/385
(58) Field of Classification Search ................ 705/44, 705/35, 37, 39; 235/375, 385, 379–382
See application file for complete search history.

(56) References Cited

U.S. PATENT DOCUMENTS

| | | |
|---|---|---|
| 5,903,830 A | 5/1999 | Joao et al. |
| 5,945,653 A | 8/1999 | Walker et al. |
| 6,000,608 A | 12/1999 | Dorf |
| 6,012,049 A | 1/2000 | Kawan |

(Continued)

FOREIGN PATENT DOCUMENTS

WO   WO 01/022333 A1  *  3/2001

(Continued)

OTHER PUBLICATIONS

Shermach, Kelly: the Vibrant World of Loyalty, pp. 30-40, *Credit Card Management*, v15, n5, Aug. 2002.

(Continued)

*Primary Examiner*—Narayanswamy Subramanian
(74) *Attorney, Agent, or Firm*—Hunton & Williams LLP

(57) ABSTRACT

A system and method for adding value into a customer's stored-value account is provided. A stored-value card is distributed to a merchant for distribution to a customer who has an account with an associated account number with a specific provider of goods and/or services. The card has an associated identifier used to associate a value with the card. Associated value is redeemable with one or more providers, including the specific provider. During a card purchase, a central processor receives a request to activate the card from a merchant terminal. The central processor receives a redemption request comprising the identifier from the customer. The central processor identifies the provider and account number, and inserts the associated value into the account. The central processor receives a subsequent request to activate the card from a merchant terminal, recognizes the card, identifies the provider and account number, and inserts the value into the account.

20 Claims, 10 Drawing Sheets

U.S. PATENT DOCUMENTS

| | | | |
|---|---|---|---|
| 6,188,752 B1 | 2/2001 | Lesley | |
| 6,208,851 B1 | 3/2001 | Hanson | |
| 6,311,170 B1 | 10/2001 | Embrey | |
| 6,330,544 B1 | 12/2001 | Walker et al. | |
| 6,424,706 B1* | 7/2002 | Katz et al. | 379/144.01 |
| 6,473,500 B1 | 10/2002 | Risafi et al. | |
| 6,494,367 B1 | 12/2002 | Zacharias | |
| 6,507,644 B1 | 1/2003 | Henderson et al. | |
| 6,581,827 B2 | 6/2003 | Welton | |
| 6,648,222 B2 | 11/2003 | McDonald et al. | |
| 6,745,022 B2 | 6/2004 | Knox | |
| 7,086,584 B2 | 8/2006 | Stoutenburg et al. | |
| 7,131,582 B2 | 11/2006 | Welton | |
| 7,243,839 B2* | 7/2007 | Beck et al. | 235/380 |
| 2002/0119767 A1 | 8/2002 | Fieldhouse et al. | |
| 2003/0200179 A1* | 10/2003 | Kwan | 705/65 |
| 2004/0230536 A1 | 11/2004 | Fung et al. | |
| 2005/0127169 A1* | 6/2005 | Foss, Jr. | 235/380 |
| 2005/0131815 A1* | 6/2005 | Fung et al. | 705/39 |
| 2005/0263587 A1* | 12/2005 | Martinez | 235/380 |
| 2006/0023856 A1 | 2/2006 | Welton | |
| 2006/0161490 A1 | 7/2006 | Chakiris et al. | |
| 2006/0213985 A1 | 9/2006 | Walker et al. | |
| 2006/0255125 A1* | 11/2006 | Jennings et al. | 235/380 |
| 2006/0289621 A1* | 12/2006 | Foss et al. | 235/375 |
| 2007/0057045 A1* | 3/2007 | Beck et al. | 235/380 |
| 2007/0187490 A1* | 8/2007 | Feldman et al. | 235/380 |

OTHER PUBLICATIONS

Michlig, Greg: Fork in the Road, pp. 36-38, *Credit Card Management*, v22, n10, Oct. 1999.

Shermach, Kelly: The Vibrant World of Loyalty: Creative Levels are High (Cover Story), *Credit Card Management*, v15, n5, Aug. 2002.

Hypercom Introduces Quick-Service Payment Options for the Retail and Restaurant Countertop and Drive-Through, *Business Wire*, p. 0140, Apr. 11, 2002.

NOVA Teams with Prior to Offer Merchants Online Affinity Program, *Phillips Business Information*, v14, Iss 17, Sep. 8, 1999.

Refocus Efforts to Prevent Fraud, *Phillips Business Information*, v11, Iss 25, Dec. 23, 1996.

Technology Stems Credit Card Fraud, *Phillips Business Information*, v13, Iss 24, Nov. 20, 1996.

Technology Stems Credit Card Fraud, *Phillips Business Information*, v6, Iss 23, Nov. 18, 1996.

\* cited by examiner

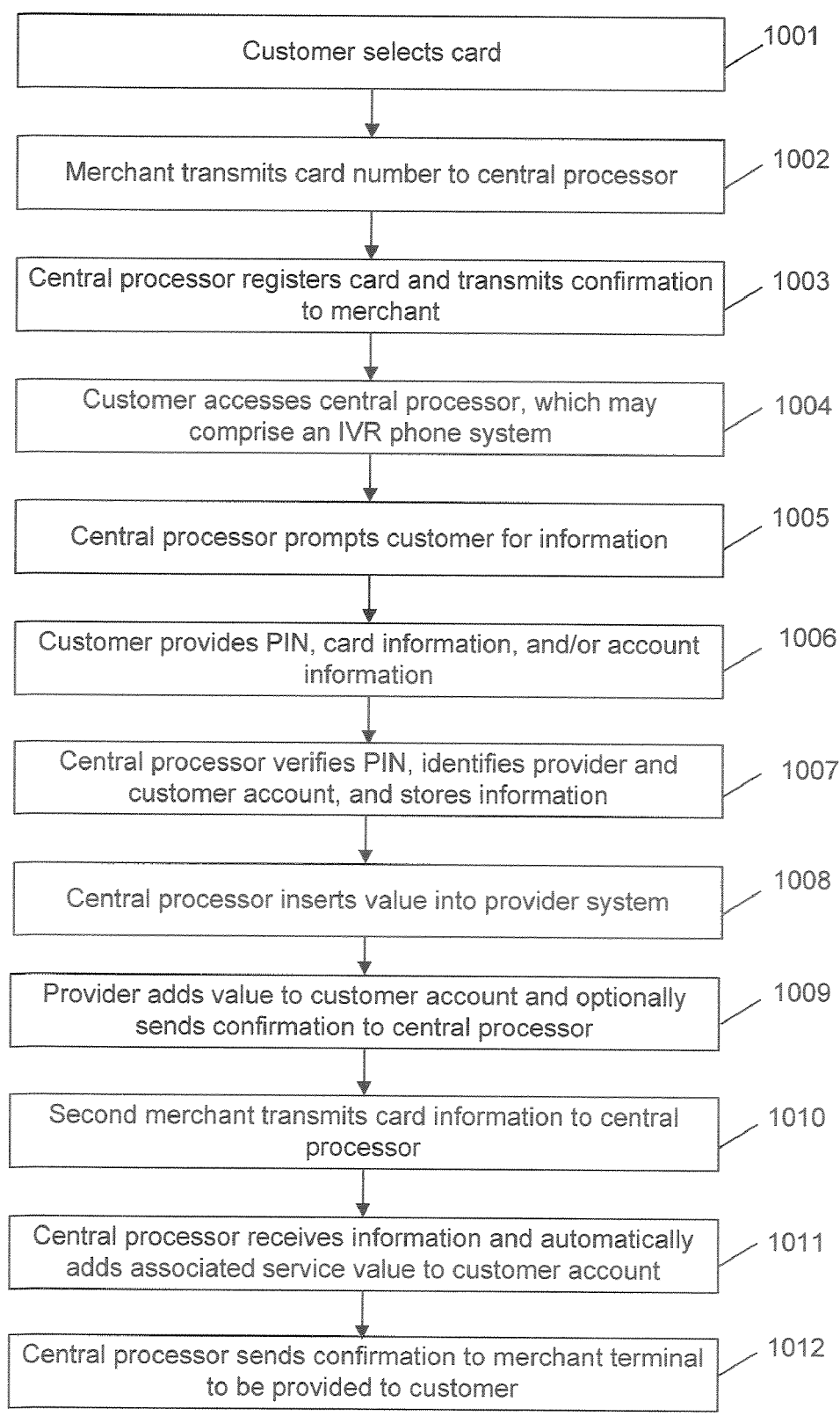

SYSTEM AND METHOD FOR ADDING VALUE TO A STORED-VALUE ACCOUNT

CROSS-REFERENCE TO RELATED APPLICATIONS

This application is a continuation of, and claims priority to U.S. application Ser. No. 10/739,301 filed on Dec. 19, 2003, which in turn claims priority to U.S. application Ser. No. 10/253,243 filed Sep. 24, 2002, which claims priority to U.S. Provisional Application No. 60/324,333 filed Sep. 24, 2001 and U.S. Provisional Application No. 60/396,404 filed Jul. 15, 2002, all of which are incorporated herein by reference in their entirety. This application also claims priority to U.S. Provisional Application No. 60/519,630 filed on Nov. 14, 2003 and U.S. Provisional Application No. 60/519,629 filed on Nov. 14, 2003, both of which are incorporated by reference in their entirety.

This application also claims priority to U.S. application Ser. No. 10/712,182 filed Nov. 13, 2003, U.S. application Ser. No. 10/655,828 filed Sep. 5, 2003, and U.S. patent application Ser. No. 10/698,084 filed Nov. 3, 2003, all of which are incorporated herein by reference in their entirety.

This application also claims priority to U.S. application Ser. No. 10/411,971, filed Apr. 11, 2003, which claims priority to U.S. application Ser. No. 09/641,363 filed Aug. 18, 2000, now issued U.S. Pat. No. 6,575,361, which claims priority to U.S. Provisional Application No. 60/149,740 filed Aug. 19, 1999, all of which are incorporated herein by reference.

This application also claims priority to the U.S. Application filed Dec. 10, 2003 under Attorney Docket No. 64243.000027, which is incorporated herein by reference.

This application is related to International Application No. PCT/US02/30281 filed Sep. 24, 2002, which is also incorporated herein by reference.

FIELD OF THE INVENTION

This invention relates to stored-value card accounts. More particularly, the invention relates to adding stored value to a stored-value account managed by a third party. As described in the related applications, the data of the stored-value cards is related to services and/or products paid or prepaid by the owner or end user of the card. Each of the stored-value cards may be associated with a PIN.

BACKGROUND OF THE INVENTION

Stored-value accounts are associated with product and/or service providers. In a preferred embodiment of the present invention, the stored-value accounts are associated with wireless telecommunications service providers (sometimes referred to as carriers). For instance, the customer may purchase a $20 PIN to enable $20 of wireless service in a wireless stored-value account.

Stored-value cards, such as prepaid long distance phone cards, are generally used in the telephone industry to allow customers to pre-purchase long distance calling time. Each of the cards has a printed identification number. Associated identification information can be magnetically stored therein or printed in a barcode. The identification number is also stored in a file in a database maintained by the card issuer. In the traditional business model, when the cards are sent to the retail location from which they will be sold, the corresponding records in the database are activated, thus allowing the card to be used immediately by a customer. To use the card as a prepaid long distance card, the customer dials a toll free number to access the card issuer's system, enters the identification number, and then makes the desired long-distance call.

These prior art prepaid phone card systems have several disadvantages. For example, since the cards are active while on the shelf in the retail location, the cards may be stolen by a thief and easily used. One way to address some of the drawbacks of prior art prepaid phone card systems would be to install activation terminals unique to the prepaid card issuer. This is referred to as a "closed system." U.S. Pat. No. 5,577,109 to Stimson et al. ("Stimson") discloses such a closed system. In the Stimson system, the cards are not preactivated. Each of the retail locations from which cards are to be sold is provided with a dedicated activation terminal which allows the retail operator to set the value of the card at the time of the sale. The activation terminal connects to the card issuer's system to pass along the value amount and to request activation of the card. Depleted cards can be recharged in the same manner as they are sold. A serious disadvantage of the Stimson system is that it requires single-function dedicated hardware to be installed in each retail location, resulting in a very inflexible and expensive system.

U.S. Pat. No. 6,000,608 to Dorf ("Dorf") provides a multifunction card system including a prepaid phone card activating system which allows cards to be purchased in varying amounts and to be recharged without requiring the use of a closed system to handle the transactions. Although Dorf purports to alleviate some of the drawbacks of Stimson by using point-of-sale devices connected to a banking system, it is believed that Dorf fails to verify sources of card activation requests so as to enhance detection of potential security breaches that could ensue in any system accessible to a large number of users.

U.S. Pat. No. 6,185,545 to Resnick et. al. ("Resnick") provides a single payment card that enables a customer to iteratively add value to a stored-value account by swiping the card at participating merchant terminals. Resnick requires that a customer first contact a central processor to associate the card with a customer account before adding value. The Resnick card cannot be purchased at the point of sale and redeemed for value. I.e., the card itself never has any value.

It is desirable to provide an improved system and method for iteratively adding value to a stored-value account using a single card.

It is further desirable to provide a system and method wherein the central processor handles PIN requests for some carriers that have stored-value accounts that are not stored at and maintained by the central processing entity that distributes and activates the cards.

SUMMARY OF THE INVENTION

According to one embodiment of the invention, a system and method for adding value into a customer's stored-value account is provided. A stored-value card is distributed to a merchant for distribution to a customer who has an account with a specific provider of goods and/or services. The stored-value card has an associated identifier that can be used to associate a stored value with the card. The associated stored value is redeemable with one or more providers, including the specific provider. The account has an associated account number. During a card purchase transaction, a central processor receives a request to activate the card from a merchant terminal. The central processor receives a redemption request from the customer, wherein the redemption request includes the identifier. The central processor identifies the provider and the account number. The central processor inserts the associated value into the account, for instance by passing a value insertion request to the provider.

In another embodiment of the invention, the central processor receives a subsequent request to activate the card from a different merchant terminal (or the same terminal). The central processor recognizes the card based on the prior transaction and identifies the provider and account number. The central processor automatically inserts the value into the account.

In another embodiment of the invention, the identifier is passed from the central processor to the merchant terminal during the card purchase transaction.

In another embodiment of the invention, the customer may specify the card value at the point of sale.

One advantage of the invention is a rechargeable card feature that enables customers to use a single card and PIN for adding value at a merchant terminal rather than purchasing and activating new cards.

According to a value insertion feature of the invention, a central processor inserts value into a customer's account with a third party provider. An advantage of this feature is that service providers are not required to maintain their own IVR system for receiving and authorizing customer requests to add value to customer accounts. The carrier may still maintain its own records separate from the central processor. Another advantage is that the invention streamlines the process of activating a PIN because the customer is not transferred from the central processor IVR to a third-party provider's system.

Another advantage is that, because the central processor can manage stored-value card activations for many customers with many different service providers, the central processor may offer promotions and monitor consumer behaviors across a large and diverse market segment. For instance, the central processor may offer additional airtime to wireless telecommunications customers who purchase a certain number of stored-value cards (for a variety of different prepaid services) in a given month. Additionally, the central processor may keep better records of PIN requests and customer information. For instance, the central processor may now discover the denominations of PINs, which may not have been disclosed to the central processor if the processor simply transferred the customer to the provider's system.

DESCRIPTION OF THE DRAWINGS

The present invention can be more fully understood by reading the following detailed description together with the accompanying drawings, in which like reference indicators are used to designate like elements, and in which:

FIG. 10 is a flowchart showing a method of recharging an account according to an embodiment of the invention.

Figure 1:
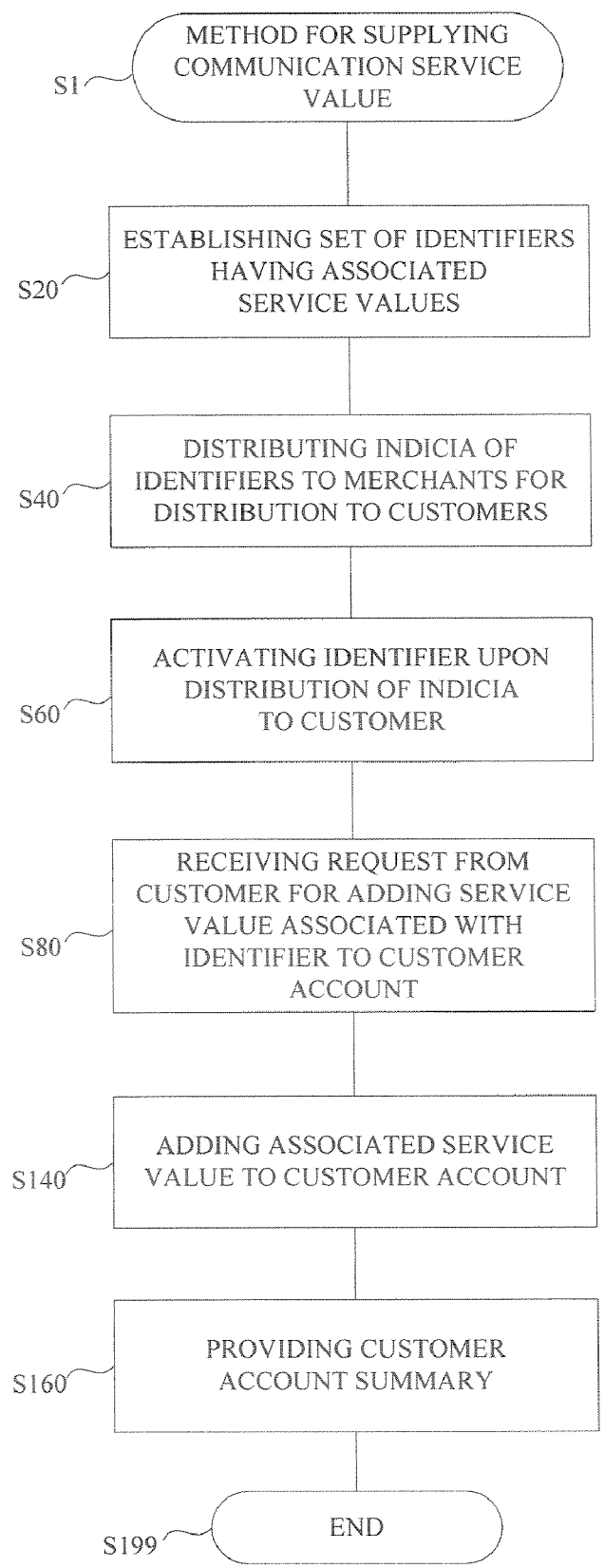
FIG. 1 is a flowchart showing a method for supplying communication service value in accordance with one embodiment of the invention.

Before any embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE DRAWINGS

Many wireless telephone users and other recipients of goods and/or services utilize prepaid account arrangements that require payment before services will be provided. It should be understood that prepaid wireless telephone service providers are used herein for exemplary purposes only. The invention relates to any good or service and any provider of a good and/or service. Examples of prepaid services that may be accommodated by a stored-value card include long distance telephone communication, wireless communication, paging and internet-enabled communication services, including wireless web access, emergency road service, legal service, accounting service, tax service, property cleaning and or maintenance service, clothe cleaning service, transportation service, travel service, delivery service, online (or off-line) dating service electrical and or gas service, water service, sewage service, internet access, and film processing (including digital film processing). Other examples of prepaid services and or products that may be accommodated by a stored-value card include gift cards, prepaid gas cards, prepaid grocery cards, prepaid entertainment cards, prepaid movie cards, downloadable ring tone cards, downloadable game cards, downloadable movie cards, downloadable music cards that use MP3, MP4, WMV, WAV, or other music formats, any other downloadable software card, customer rewards cards, bridge and or road toll cards, and any other type of stored-value cards for products, services, or both, that may be prepaid by the owner of the card.

The prepaid customers pay as they go with the carrier deducting payment for the services provided directly from the customer's account. The invention, through a combination of technologies, provides a customer-friendly process that allows the customer to add service value, i.e., money or usage credits, to his customer account maintained by a carrier which may be selected from a group of participating carriers, such that the customer can obtain the service needed.

In one aspect of the invention, a central system manages the process that allows the customer to add service value to the customer's account. The central system maintains a set of identifiers, or Personal Identification Numbers ("PINs"), with each identifier having an associated service value, which preferably represents a monetary figure (i.e., number of dollars, $10, $25 or $50, for example), or some unit of service usage (i.e., minutes). Indicia associated with the identifiers are distributed to merchants for further distribution to customers. In one example, the indicia may be distributed on magnetic stripe cards having predetermined values, such as $10, $25 and $50 cards. It should be appreciated that each indicia, or article bearing indicia, is associated with only one identifier maintained at the central system. Thus, each card distributed is linked to only one identifier maintained at the central system.

Once the customer selects the indicia, or an article bearing the indicia, the customer provides payment for the service value associated with the identifier represented by the indicia. For example, the customer pays $25 for a $25 card associated with an identifier associated with a $25 service value. The merchant sends a communication to the central system confirming the transaction with the customer so that the identifier at the central system can be activated. Following instructions provided with the indicia, the customer contacts the central system to have the service value added to the customer's account. The customer provides the central system with an input representing the identifier that has been activated, as well as the customer's account information. The customer's account information can also be utilized to identify the customer's carrier.

When the identifier and customer account information are verified, the central system communicates with the customer's carrier system to add the service value to the customer's account. Following the service value insertion, the customer's updated account information is obtained and provided to the customer. It should be appreciated that in at least one embodiment of the invention, some carriers do not provide direct service value insertion by the central system directly into the customer's account. For these carriers, an alternate carrier identifier is provided by the system, and the customer is transferred to the carrier system to complete the service value insertion.

As seen from the above examples, the central system acts as an intermediary between the customers, merchants and carriers. The central system maintains arrangements with several carriers to allow for value insertion, and becomes a broker of prepaid communication services. The customer is benefited by having access to a resource that can be obtained at several points of sale and allows an easy method to replenish service value for a number of participating carriers. The carriers benefit by having a product in the marketplace whereby customers can more easily replenish customer account balances. Lastly, the merchants benefit from increased sales because they are selling a product that is in demand because it is a single product that allows customers to select from a number of carriers.

In at least one implementation of the invention, the central system manages at least one relational database of information while also allowing access by the various users of the central system (i.e., customers, merchants, and administrators), to the various features and interfaces of the invention. A relational database system allows information contained in different tables to be accessed and shared, while also providing the additional advantage that changes to data contained in one table of a relational database affects the same data in any other table sharing the same data. A table is a collection of several data records with similar data information fields. Data records represent a collection of data that is organized into fields. These fields may also be formatted to receive data of varying types Accordingly, the central system, or a user of the system, can process, query or report data contained in the various data tables and records for use in accomplishing the features of the invention. In one aspect of the invention, the various databases could include the set of identifiers and Mobile Identification Numbers ("MINs"), for example.

Method for Supplying Communication Service Value

In accordance with one embodiment of the invention, an illustrative flowchart showing a method for supplying communication service is shown in FIG. 1 and described below.

The process begins in step S1, and passes to step S20, which includes establishing a set of identifiers having associated service values. As described above, each identifier forms a part of a data record, or identifier record, that allows the central system to identify the specific associated service value that will later be sold to a customer. One example of an identifier is a Personal Identification Number ("PIN"). The PIN comprises one field of the identifier record, while another field in the same identifier record contains the associated service value. Illustratively, record X may have identifier ABC and an associated service value of $25. The service value is preferably a monetary figure (i.e., an amount in dollars, $10, $25 or $50, for example), but may also represent some unit of service usage, if supported by the carrier systems (i.e., minutes).

The set of identifiers forms the identifier database. Each identifier record may also contain fields for Status Indicator (i.e., whether the identifier is Active or Inactive), Serial Number, Visa Account Network Number (VAN), or a Merchant Code identifying the merchant through which the indicia will be distributed.

Following the establishment of the set of identifiers, in step S40, the process includes distributing indicia of the identifiers to merchants for distribution to customers. As described above, the indicia provides information related to the identifier for several reasons. First, the indicia allows the merchant to communicate to the central system the identifier that must be activated following distribution. Similarly, the information conveyed by the indicia later allows the customer to communicate to the central system the identifier and the service value purchased when the indicia was obtained from the merchant. It should be appreciated that the indicia may also encompass any article bearing such information. In other aspects, the indicia may provide instructions to the customer for communicating with the central system.

The indicia may comprise an article, such as magnetic stripe card, smart card, bar coded card, or any combination thereof. Either the magnetic stripe, chip or bar code would contain information that represents the card's identifier. Therefore, when completing the sale of the card to the customer, the merchant could swipe the card through a network terminal, or alternatively, scan the bar code on the card. The merchant's system would then locate the identifier and notify the central system of the sale of the article bearing the associated identifier.

To allow the customer to utilize the card upon purchase, the card also displays the identifier so that the customer can communicate the identifier to the central system. In addition, the card should display the service value associated with the identifier represented on the card to facilitate the customer's purchase of the correct card. Lastly, the card should contain instructions for communicating with the central system, i.e., a general toll-free number.

The indicia may also be provided to the customer through the delivery of a receipt or other notice. In such an embodiment, the customer would commence a purchase transaction at the point of sale, either through the merchant or a system device, such as a verifone terminal. The customer would request a certain prepaid service value, and upon payment, the central system would deliver the identifier to the point of sale for distribution to the customer.

Then, in step S60, the process includes activating an identifier upon distribution of indicia to a customer. As described above, the identifiers may be activated following communication from the merchants of the indicia distribution to the customers. This measure assists in avoiding the theft of the indicia prior to payment. The activation may include changing a status indicator associated with the specific identifier record from Inactive to Active. The communication between the merchant and central system preferably comprises a "host-to-host or Visanet connection", but may include any network communication wherein the central system receives input from the merchant system confirming the transaction. Accordingly, the features of the present invention may use or be combined with any of the features described in U.S. application Ser. No. 09/641,363, filed Aug. 18, 2000, which is incorporated herein by reference in its entirety.

Following the distribution of the indicia to the customer, in step S80, the process includes receiving a request from the customer for adding the service value associated with the identifier to a customer account. To handle the request, in one embodiment of the invention, the central system includes an Interactive Voice Response ("IVR") system that the customer can contact through a dedicated telephone number. Upon calling the number, the customer is presented with a series of voice prompts, process selections and other options that assist the customer in requesting that the service value purchased be added to the customer account.

It should be appreciated that the IVR system may be configured to provide voice prompts to the customer requesting customer input, accepting the customer's input (i.e., by capturing the DTMF, for example), and processing the customer's input to provide adequate responses and take the necessary actions. The customer's request includes the customer's entire communication session with the central system, i.e., the customer's interaction with the IVR system. Hereinafter, it should be appreciated that any request for input from the customer by the IVR system may be in the form of a voice prompt or message requesting the customer to select a numbered option on a telephone keypad. Although contemplated for automated use, at anytime during communication with the IVR system, the customer may choose an option that provides for transfer to customer service personnel who will complete the transaction for the customer.

Additionally, the IVR system may be configured to accept customer input meeting certain criteria, such as the correct number of digits in a number. When the customer input does not fit within the predetermined criteria (i.e., a 10-digit telephone number when the IVR system requests the customer's MIN), the IVR system may be configured to allow the customer to repeat an input, or when a certain predetermined number of incorrect inputs are received, transfer the customer to customer service personnel. The IVR system may also be configured to provide language selection features (i.e., the customer selects the language for the voice prompts, such as English, Spanish, French, German, for example), customer selection confirmation features, help features, customer instructions or other navigation features that may be accessed at anytime during communication with the central system.

While the above examples describe accessing the central system through the use of an IVR system, access to the central system may be achieved via any suitable communication interface, Ethernet connection, modem, telephone, digital or analog connections with the system using wireless communication devices (i.e., mobile phones, PDAs, or other handheld wireless communication devices), point of sale device or transceiver device (i.e., a verifone terminal, for example), token ring, Internet or Intranet or other computer connection, or any other suitable connection that allows the customer to receive input from and send output to the central system through the network connection.

Figure 2:
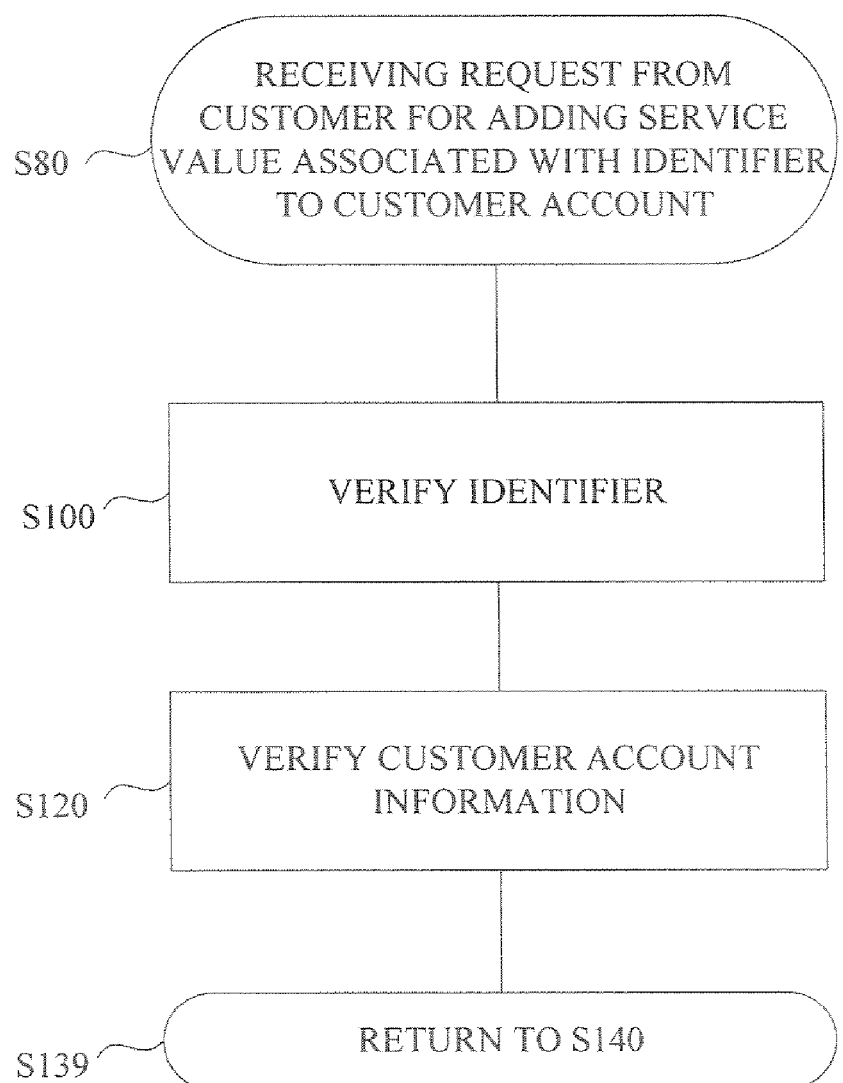
FIG. 2 is a flowchart showing the "receiving request from customer for adding service value associated with identifier to customer account" step of FIG. 1 in further detail in accordance with one embodiment of the invention.

FIG. 2 is a flowchart showing the "receiving request from customer for adding service value associated with identifier to customer account" step of FIG. 1 in further detail in accordance with one embodiment of the invention. The request from the customer to add the service value to the customer's account must include an identifier input (i.e., the PIN) representing the identifier associated with the indicia purchased, as well as input from the customer describing the customer's account (i.e., the customer's Mobile Identification Number, which allows the central system to identify the customer's carrier). Thus, as shown in FIG. 2, the process continues in step S80 and passes to step S100, wherein the identifier is verified. Following verification of the identifier, in step S120, the customer account information is verified.

Figure 3:
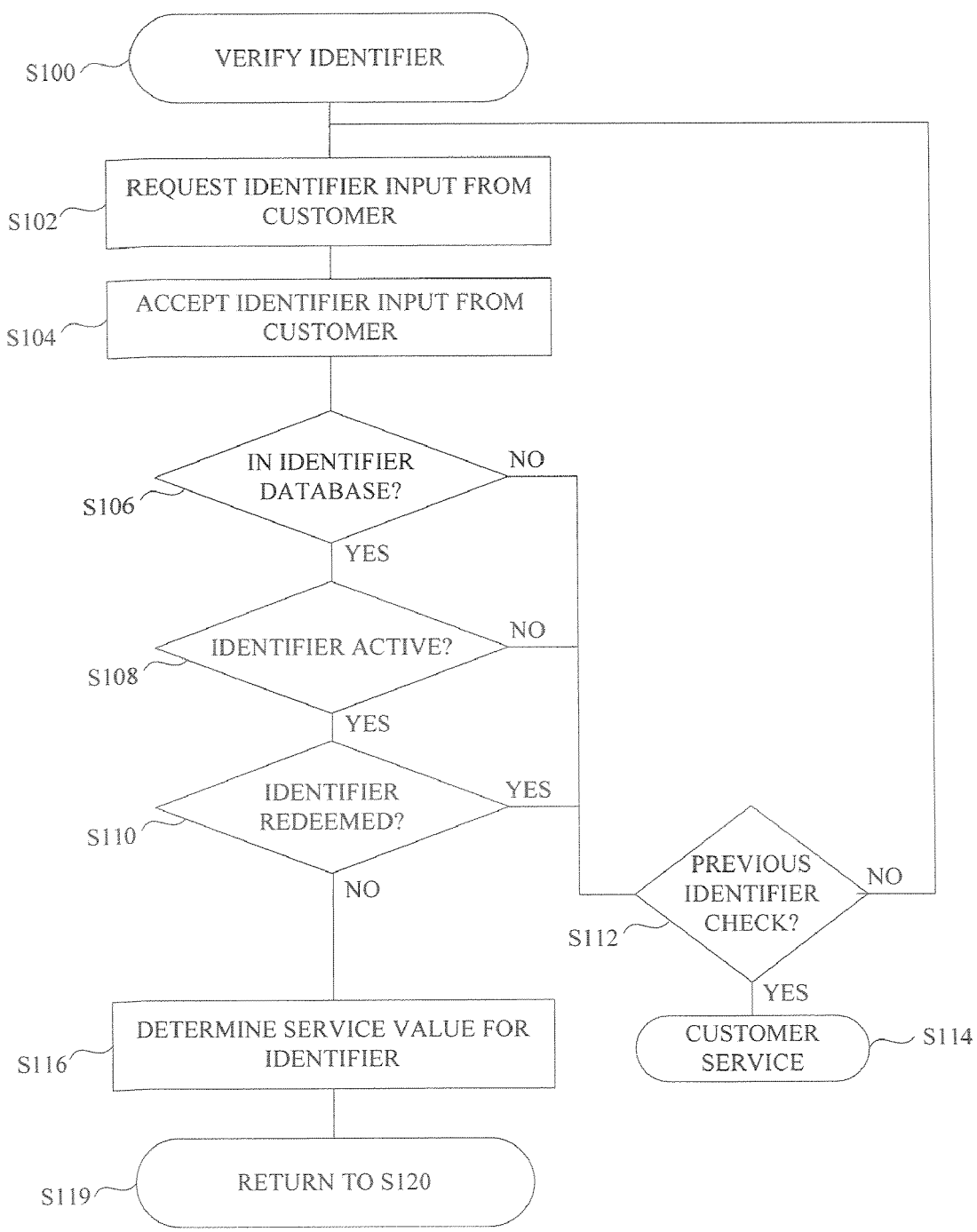
FIG. 3 is a flowchart showing the "verify identifier" step of FIG. 2 in further detail in accordance with one embodiment of the invention.

FIG. 3 is a flowchart showing the "verify identifier" step of FIG. 2 in further detail in accordance with one embodiment of the invention. As shown in FIG. 3, the process continues in step S100, and passes to step S102, wherein the IVR system requests the identifier input from the customer (i.e., voice prompt requesting PIN from card, for example). In step S104, the system accepts the identifier input from the customer (i.e., the PIN provided on the card, for example). Then, in step S106, the system determines whether the identifier input correlates with an identifier from the set of identifiers maintained by the central system. The central system compares the PIN provided by the customer with those kept in the identifier database. If a record containing the PIN is found on the database, the process passes to step S108. If the identifier is found in the database, the system determines whether the identifier is active in step S1108. The status of the identifier can be determined by relating a Status Indicator associated with the pertinent identifier record. Thus, when the central system finds the identifier record, it can determine whether a value in the Status Indicator field represents Active or Inactive status. If the identifier is found in the database and is active, the system determines whether the identifier has already been redeemed in step S110. This feature allows the central system to inform the customer that the identifier has already been redeemed. In some circumstances, the customer's communication session with the central system may be ended prematurely, before confirmation of the value insertion procedure. When this occurs, the customer may not be aware that the value insertion function was completed in the prior call. Thus, if the customer had previously called within a certain period (i.e., the last 24 hours), the central system can inform the customer that the value insertion was successful. If the identifier has not been redeemed, the process passes to step S116.

If the identifier cannot be found in the database in step S106, or the identifier is found in the database but is determined to be inactive in step S108, or the identifier is found in the database and is active, but is determined to have already been redeemed in step S1110, the process passes to step S112. The system determines whether there has been a previous identifier check in step S12, and if so the process passes to step S114, where the customer is transferred to customer service. A previous identifier check would have occurred if the customer had previously supplied identifier input and the input failed any of the determinations in steps S106, S108 or S110. If there had not been a previous identifier check, the process returns to step S102, where the systems requests that the customer re-enter the identifier input.

For those identifiers found in the system that are active and have not been redeemed, in step S116 the system determines the associated service value for the identifier. The process then passes to step S119, wherein it returns to step S120.

Figure 4:
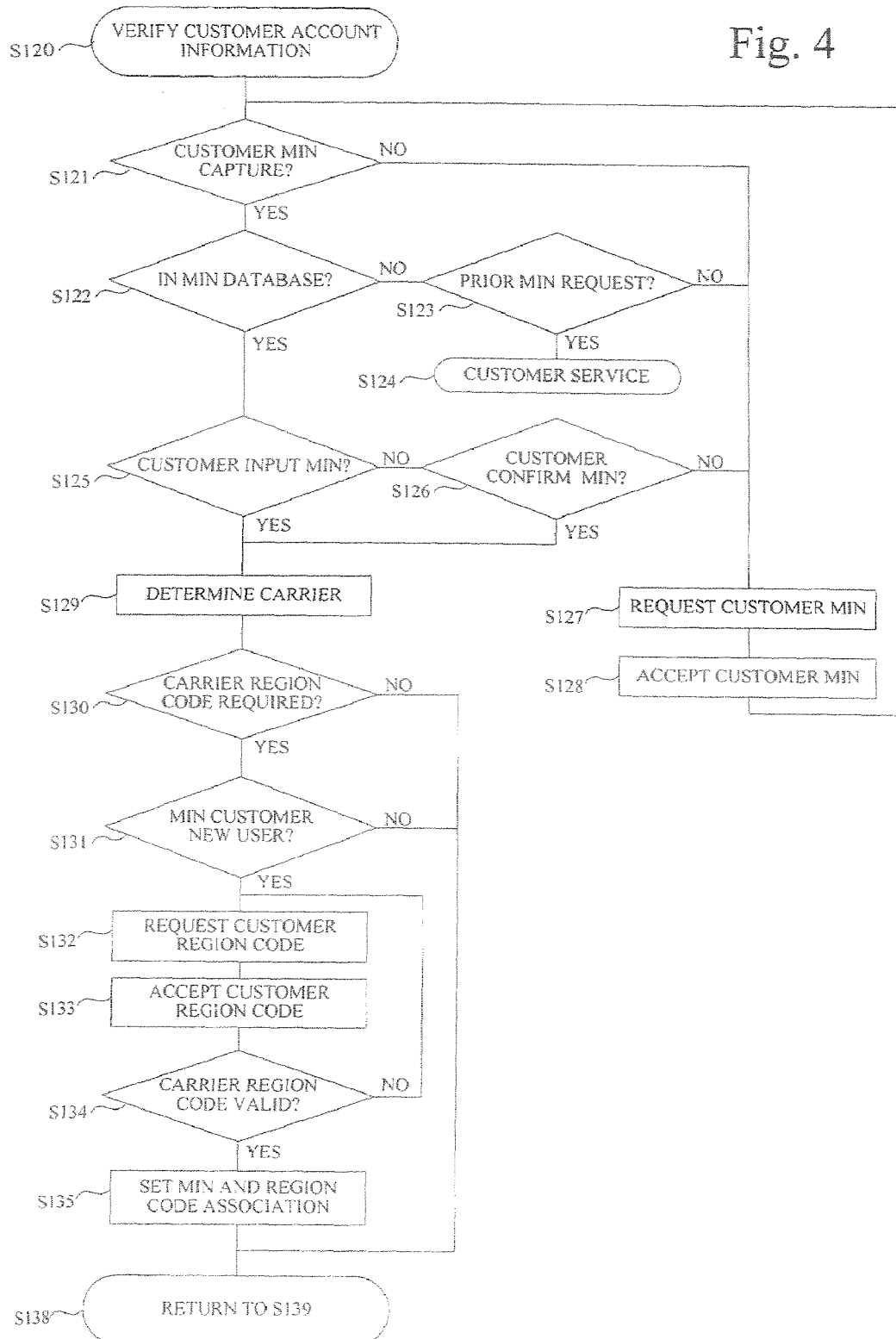
FIG. 4 is a flowchart showing the "verify customer account information" step of FIG. 2 in further detail in accordance with one embodiment of the invention.

FIG. 4 is a flowchart showing the "verify customer account information" step of FIG. 2 in further detail in accordance with one embodiment of the invention. The customer supplies his customer account information to ensure that the service value purchased is credited to the correct customer account, or Mobile identification Number ("MIN"), at the correct carrier system. As shown in FIG. 4, the process continues in step S120 and passes to step S121. First, the system determines whether the customer MIN was captured when the customer contacted the central system in step S121. The customer's MIN can be captured utilizing Automatic Number Identification ("ANI"), or similar caller ID function. Through ANI, the central system acquires the customer's MIN from the ISDN transmission. Alternatively, the customer may supply his MIN upon request. This would allow the customer to confirm which MIN account the prepaid service value should be credited.

If the customer's MIN has not already been captured, the process passes to step S127. If the MIN has been captured, the process passes to step S122, wherein the system determines whether the customer's MIN can be found in the MIN database. The MIN database is a compilation of existing MINs that includes each MIN, as well as the associated carrier. The MIN database may be stored locally in the central system, or maintained externally in a publicly accessible database, such as Telcordia®. This database may also include one created pursuant to the Wireless Local Number Portability Act. If the MIN is not found in the MIN database, the process passes to step S123. In situations when the MIN is not found in the MIN database, the customer may have contacted the central system using a non-wireless phone or other non-telephone connection, the system prompts the customer to enter the MIN that the customer wishes to add the service value. If the MIN is found in the MIN database, the process passes to step S125.

In step S123, the system determines whether the system has previously requested the customer's MIN from the customer. If so, the process passes to step S124, wherein the customer is transferred to customer service personnel. If the customer's MIN has not been previously requested, the process passes to step S127.

In step S125, the system determines whether the customer input his MIN. If so, the process passes to step S129. If not the customer did not input his MIN, the process passes to step S126, wherein the system determines whether the customer MIN has been confirmed. The confirmation includes input from the customer that the MIN identified is the correct account to add the service value. If the MIN is confirmed, the process passes to step S129.

Alternatively, if the customer MIN is not confirmed, the process passes to step S127, wherein the system requests that the customer provide input representing the customer's MIN for which the service value addition is requested. Then, in step S128, the system accepts the customer's MIN input before returning to step S121.

In step S129, the system determines the customer's carrier. The carrier can be determined by locating the MIN identified in the MIN database and relating the associated carrier. Once the carrier is determined, in step S130, the system determines whether the customer must supply a carrier region code based on the customer's carrier. If not, the process skips to step S138. If the carrier region code is required, the system requests the customer's carrier region code in step S132. The carrier region code may be required for carriers that have regional centers that maintain data on the local mobile phone customers. The carrier region code may be represented by the customer's zip code.

In step S133, the system accepts the customer's carrier region code, and the process passes to the step S134. The system determines whether the carrier region code is valid in step S134. The code will be presumed valid if it can be related to a region code maintained in a carrier specific region code database. If the code is simply the customer's zip code, the system can determine the appropriate carrier region by referring to the carrier database. If the code is not valid, the process returns to step S132, wherein the system requests reentry of the region code. If the code is valid, the process passes to step S135, wherein the system sets an association between the customer's MIN and the carrier region code, to avoid later requests of the code upon subsequent interactions. The process then passes to step S138, wherein it returns to step S139.

Figure 5:
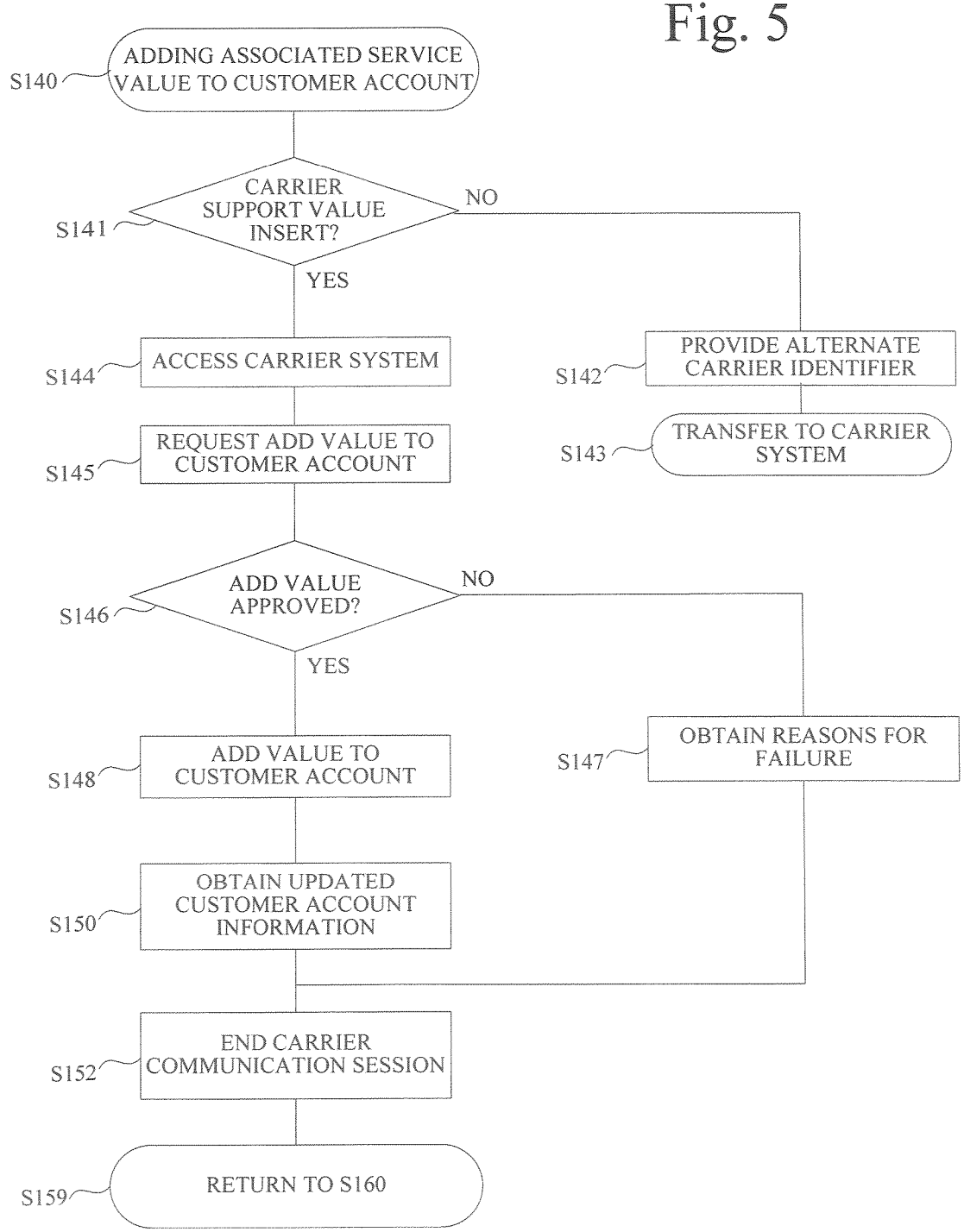
FIG. 5 is a flowchart showing the "adding associated service value to customer account" step of FIG. 1 in further detail in accordance with one embodiment of the invention.

After receiving the customer's request, in step S140, the process includes adding the associated service value to the customer account. FIG. 5 is a flowchart showing the "adding associated service value to customer account" step of FIG. 1 in further detail in accordance with one embodiment of the invention. The process continues in step S140 and then passes to step S141, wherein the system determines whether the customer's carrier support value insertion of service value into its customers' accounts. If the carrier does support direct value insertion, the process passes to step S144, wherein the system access the carrier system. Then, in step S145, the system requests approval from the carrier system to add the service value associated with the identifier to the customer's account. In step S146, the system determines whether the add value request is approved. If so, the process passes to step S148, wherein the system adds the service value to the customer's account, and then passes to step S150, wherein the system obtains updated customer account information from the carrier system. This updated account information may include the new account balance, as well as the account's expiration date, for example. The process then passes to step S152.

However, if in step S146, the system determines that the add value request was not approved, the process passes to step S147, wherein the system obtains the reasons from the carrier system that the value insertion was not approved. The process then passes to step S152, wherein the system ends the communication session with the carrier system. The process then passes to step S159, wherein it returns to step S160.

For those carriers that do not support direct value insertion, in step S142, the system provides the customer with an alternate carrier identifier. This carrier identifier operates similarly to the identifier used with the central system, however, the carrier identifier must be redeemed through communication with the carrier system. These carrier identifiers may be maintained in a separate carrier identifier database. Accordingly, in step S143, the system transfers the customer to an IVR system managed by the carrier system to complete the value redemption.

Figure 6:
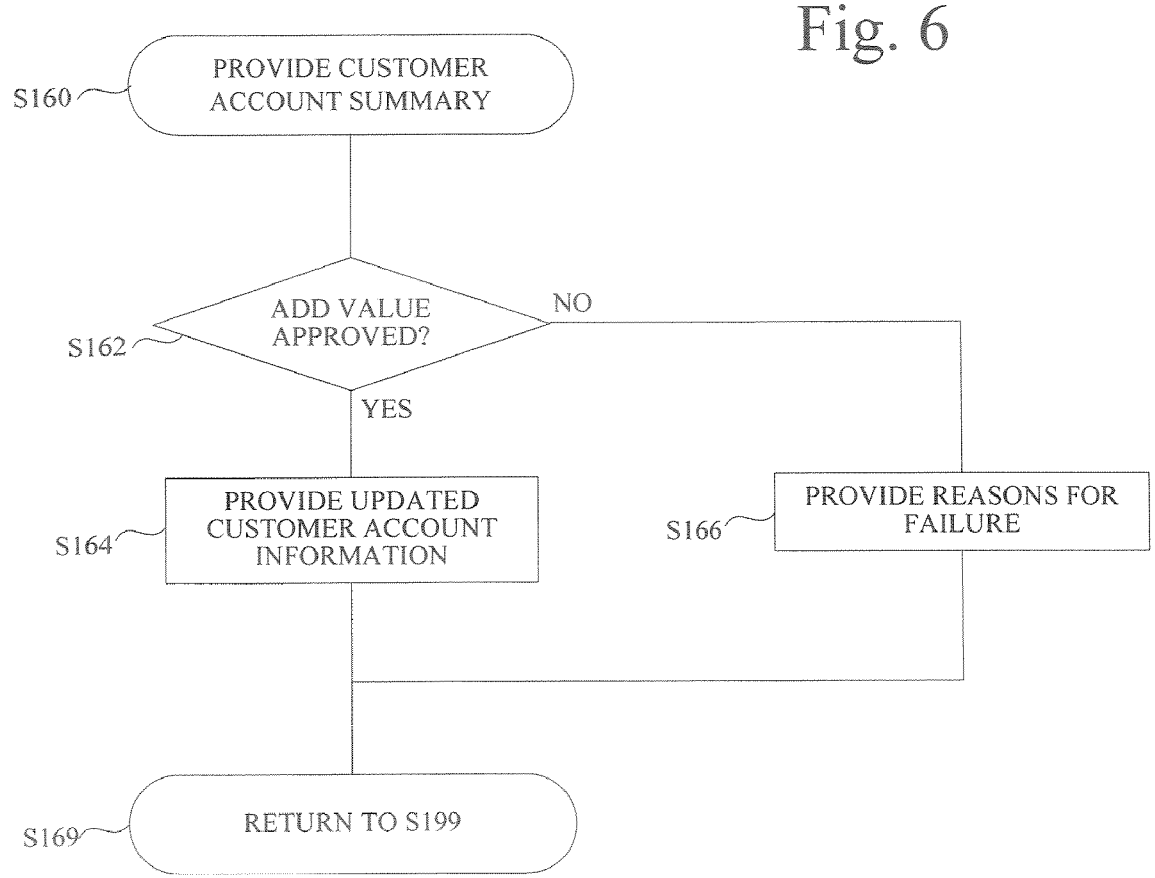
FIG. 6 is a flowchart showing the "provide customer account summary" step of FIG. 1 in further detail in accordance with one embodiment of the invention.

Returning to FIG. 1, in step S160, the process includes providing the customer with a customer account summary. FIG. 6 is a flowchart showing the "provide customer account summary" step of FIG. 1 in further detail in accordance with one embodiment of the invention. The process continues in step S160, and then passes to step S162, wherein the system determines whether the value insertion was approved by the carriers system. If so, the process passes to the step S164, wherein the system provides the updated customer account information to the customer. The process then passes to step S169. If the value insertion was not approved, the process passes to step S166, wherein the system provides the customer with the reasons for the denial of the request. These reasons may include that the customer's balance in the customer account is already too high or exceeds a predefined limit, the account cannot be found by the carrier, the account has been cancelled or any unspecified carrier error. The process then passes to step S169, where it returns to step S199. Once the system provides the customer with the customer account summary, the process passes to step S199, where it ends.

It should be appreciated that the methods described herein may be adapted such that each indicia of an identifier distributed may not have a predetermined associated service value. In this respect, the indicia would include the identifier, however, the customer would be allowed to select a service value to purchase for the card. Therefore, upon distribution of the card, the customer would select a service value, such as $25, for insertion into the record at the central system. The communication from the merchant would notify the central system of the amount purchased, which would then be inserted into the associated service value field for the record.

An Illustrative Communication Service Value System

Figure 7:
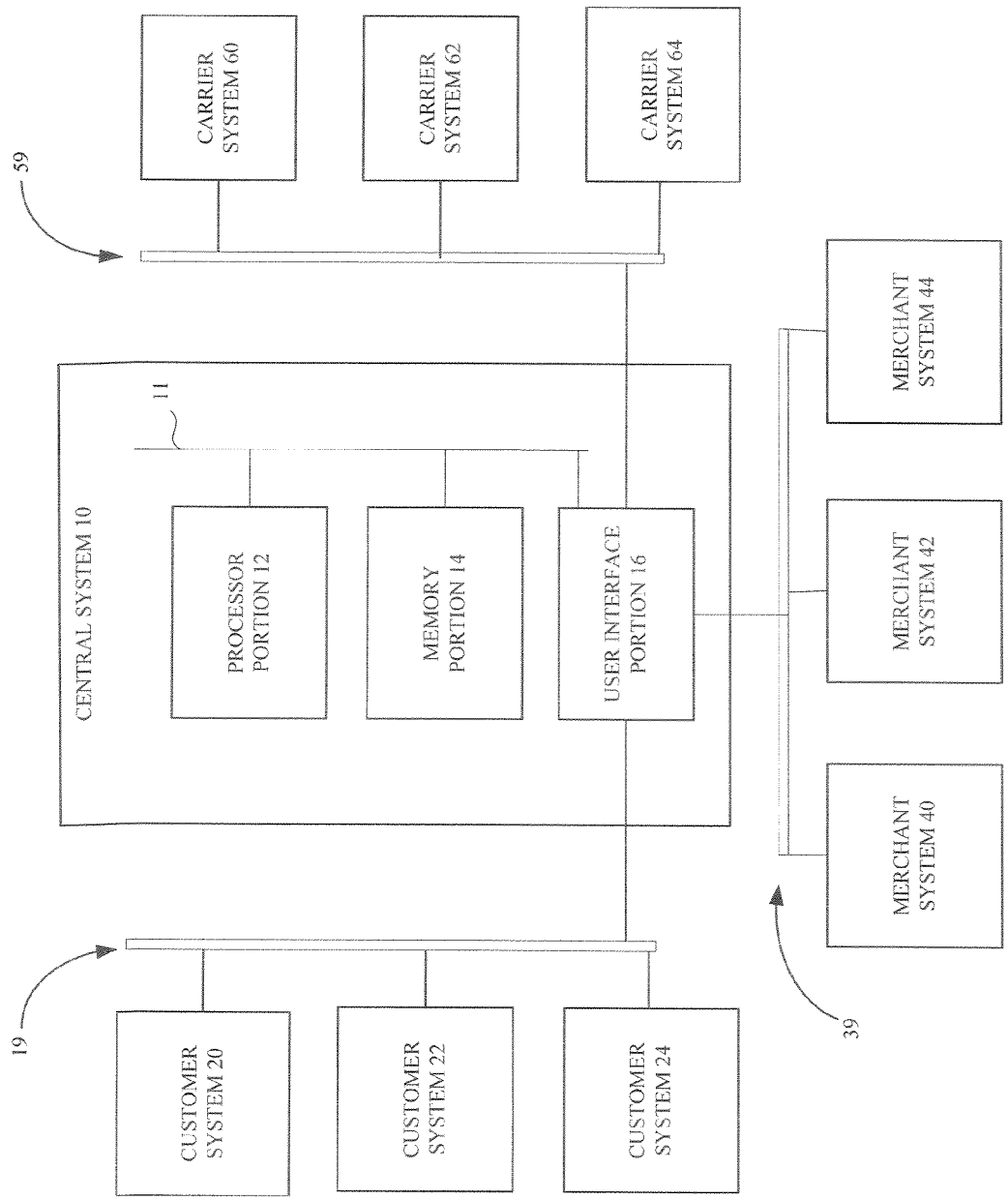
FIG. 7 is a diagram showing an illustrative system for supplying communication service in accordance with one embodiment of the invention.

As described above, FIG. 7 is a diagram showing an illustrative system for supplying communication service value in accordance with one embodiment of the invention. FIG. 7 illustrates a central system 10, a plurality of customer systems 20, 22, and 24, a plurality of merchant systems 40, 42, and 44, and a plurality of carrier systems 60, 62, and 64. Each customer system 20, 22 and 24 is in selective communication with the central system 10 through customer network 19. Each merchant system 40, 42 and 44 is in selective communication with the central system 10 through merchant network 39. Each carrier system 60, 62 and 64 is in selective communication with the central system 10 through carrier network 59. It should be appreciated that customer network 19, merchant network 39 and carrier network 59 may be the same network in some embodiments of the invention.

The central system 10 comprises a processor portion 12 for processing input from and generating output to the various customer, merchant and carrier systems in communication with the central system 10, a memory portion 14, the processor portion 12 retrieving data from and storing data for use by the central system 10 in the memory portion 14, and a user interface portion 16 accepting input from and transmitting output to the various customer, merchant and carrier systems in communication with the central system 10. Each of processor portion 12, memory portion 14 and user interface portion 16 are connected to and in communication with each other through a data bus 11. It should be appreciated that the IVR system may utilize components from each of the processor portion 12, memory portion 14 and user interface portion 16.

The processor portion 12 monitors and controls the various operations of the central system 10. Initially, the processor portion 12 processes the information provided by the merchant system 40 when confirming the indicia distribution and the customer system 20 when accessing, or making requests of, the central system 10. The customers accessing the central system 10 provide their input through the use of user interfaces presented by the user interface portion 16, which includes the voice prompts and options presented by the IVR system.

The memory portion 14 serves as a memory store for a wide variety of data used by the processor portion 12, as well as the other components of the central system 10. For example, in one embodiment, the memory portion 14 contains the various databases of identifiers and associated service values, MINs, carriers, and other information needed by the central and IVR systems. It should be appreciated that the various memory components contained in the memory portion 14 may take on a variety of architectures as is necessary or desired by the particular operating circumstances. Further, the various memory components of the memory portion 14 may exchange data or utilize other memory component data utilizing known techniques such as relational database techniques.

The user interface portion 16 provides the interface through which the user can provide input to and receive output from the central system 10. The user interface portion 16 generally provides interaction capabilities for communicating with the customer, merchant and carrier systems. The user interface portion 16 is controlled by the processor portion 12, or components thereof, to interface with a customer or other operating system, including inputting and outputting data or information relating to the central system 10. The user interface portion 16 also provides the interface between the system administrator, the central system 10, and other remote systems. A system administrator mainly utilizes the user interface portion 16 to manage the storage of data and information in the memory portion 14, as well as provide updates to the central system 10 applications and functions.

In operation, a customer utilizing a suitable customer system 20 accesses the central system 10 through customer network 19. The customer system 20 may be any suitable processing machine, such as a mobile phone, as well as a computer accessing the Internet, personal digital assistants (PDAs) or other wireless communication device, networked to customer network 19. The merchant system 40 may be any suitable processing machine, including a transceiver device (i.e., a verifone terminal, for example) capable of receiving input from the central system, printing indicia or other information, performing smart card or magnetic stripe card reader or bar code scanner functions, and sending output to the central system 10. Accordingly, in one embodiment of the invention, to activate an identifier upon payment, the card is swiped through an appropriate card interface on the merchant transceiver, which initiates a network connection to the central system 10, wherein the central system 10 activates the identifier in the appropriate database.

The user interface portion 16 also transmits data to the customer system 20 to present a user interface on the customer system 20 for accepting input and allowing the customer to submit output to the central system 10. Although these user interfaces have been described with respect to an IVR system, alternate user interfaces may be presented on an Internet web page whereby customers access the page and provide the necessary redemption information on an appropriate form.

Although several customer systems and vendor systems are shown in FIG. 7, it should be appreciated that in some embodiments of the invention, there may be only one customer system and one vendor system, each in selective network communication with the central system 10.

The user interface portion 16 accepts the customer request for value insertion from the customer system 20, including the identifier input and customer account input. The processor portion 12 verifies the identifier input with the identifier database maintained in the memory portion 14, and then verifies the customer account input with the MIN database, either maintained locally in the memory portion 14 or externally in a publicly available database of MINs. The user interface portion 16 then communicates with a carrier system 60 to complete the value insertion process before providing the customer with a customer account summary.

It should also be appreciated that the invention may include a device for distributing communication service value. Such a device may include a distribution terminal (i.e., a verifone terminal-like device or a vending machine-like apparatus) that allows a customer to select a prepaid service value for purchase, and make payment for the service value. The terminal would include a product selection portion for presenting the various service value denominations available (i.e., any user interface for accepting the customer's selection, for example), a payment portion for receiving payment from the customer (i.e., through cash, or magnetic stripe card or smart card readers, for example), a communication port ion for notifying the central system of the sale of the indicia and the need to activate the associated identifier (i.e., a modem, for example), and a delivery portion for providing the customer with the indicia of the identifier (i.e., a mechanical card delivery system or printer means to provide a printout of the indicia, for example).

As described above, FIGS. 1-6 illustrate various embodiments of the method of the invention. FIG. 7 represents an illustrative embodiment of the system of the invention. It should be appreciated that the system of the invention or portions of the system of the invention may be in the form of a "processing machine," such as a genera purpose computer or other network operating system, for example. As used herein, the term "processing machine" is to be understood to include at least one processor that uses at least one memory. That at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, a dedicated circuit, IP based connection, the Internet, Intranet, Extranet, LAN, WAN, VPN, an Ethernet, or any client server system that provides communication, for example. Such communications technologies may use any suitable protocol such as TCP/IP, UDP, OSI, SNA, X.25, ISO 85/83, XML or SOAP, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may comprise a series of Interactive Voice Responses, or take the form of a dialogue screen, for example. A user interface may be in the form of a web page or other interactive application presented on a customer system by the customer's browser. The web page or application could include fields for accepting data and transmitting data to the advertising marketing system for storage. A user interface may also include any of a mouse, touch screen, keyboard, keypad, card slot, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

Figure 8:
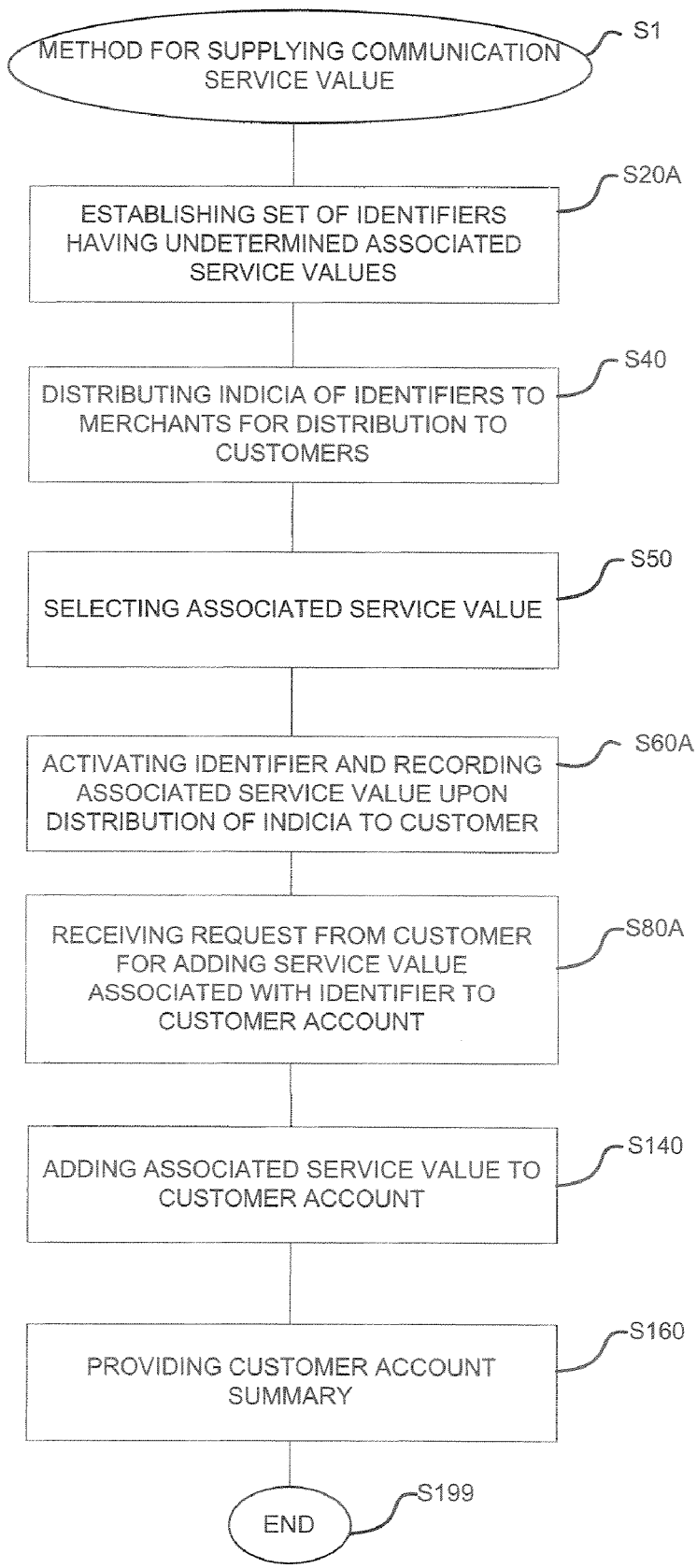
FIG. 8 is a flowchart showing a method for supplying communication service according to an embodiment of the invention.

FIG. 8 is a flowchart showing a method for supplying communication service. This method is very similar to the method of FIG. 1, described above. However, in this embodiment, the associated service value is not initially pre-established, but instead it is determined when it is selected by a customer at the time of distribution of the identifiers to the customer. In this respect, the indicia would include the identifier; however, the customer would be allowed to select a service value, such as $25 or $50, for insertion into the record at the central system. As previously noted, the service value could alternately be a another unit of service usage, such as a number of minutes. The communication from the merchant would notify the central system of the amount purchased, and this information would then be inserted into the associated service value field for the record.

Thus, as shown in FIG. 8, a set of identifiers having undetermined associated service values is established, in step S20A. Then in step S40, as also shown in FIG. 1, the indicia of identifiers to merchants for distribution to customers is distributed. Unlike in FIG. 1, the process proceeds to step S50, where the customer selects the associated service value, such as $10, $25, or $50. Then in step S60A, the identifiers are activated and the associated service value is recorded when the indicia is distributed to the customer.

In step S80A, the request from the customer for adding service value associated with the identifier to the customer's account is received. This step is further elaborated in FIG. 9, discussed below. Finally, the associated service value is added to the customer account in step S140, and the customer account summary is provided in step S160.

Figure 9:
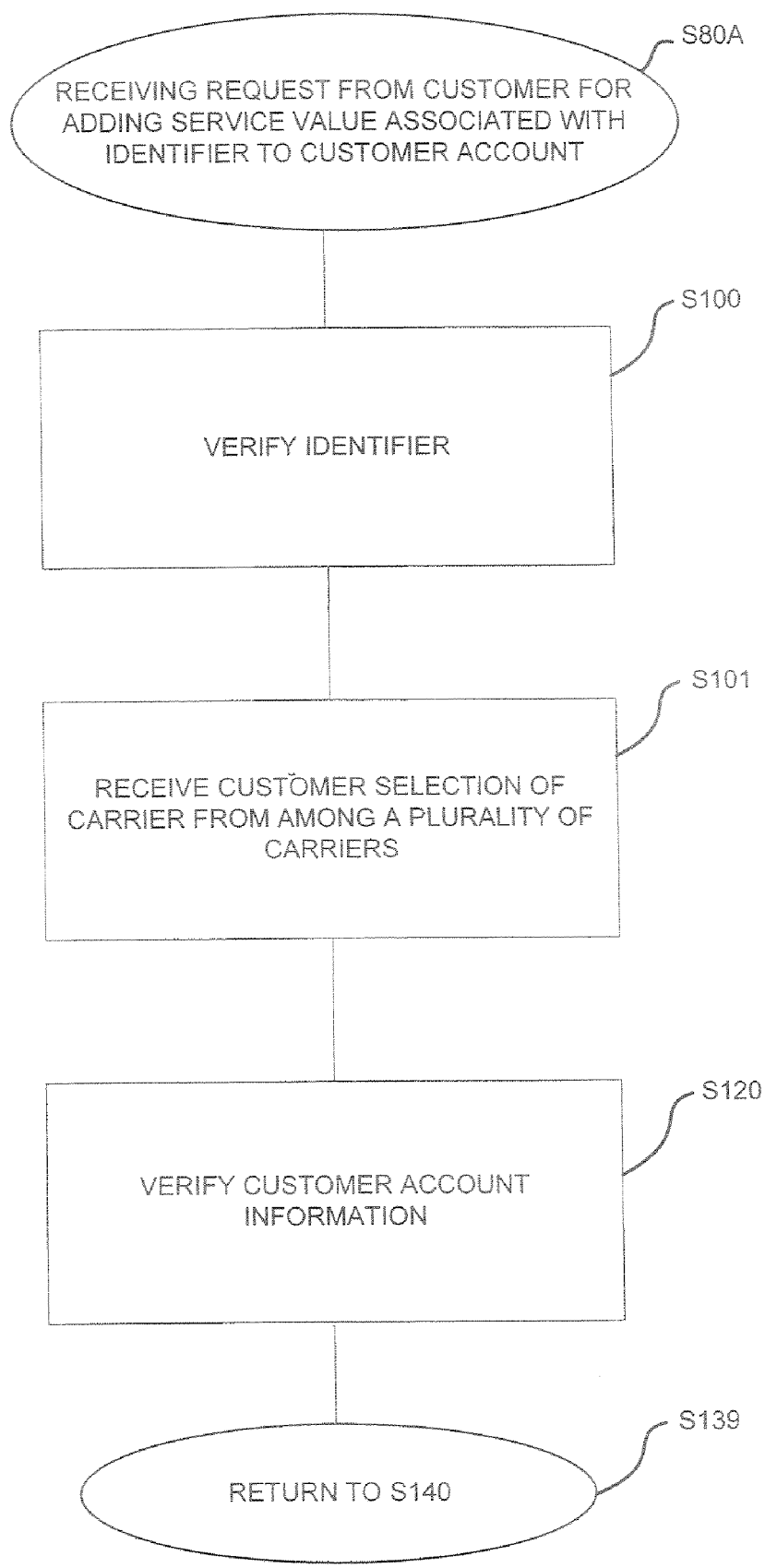
FIG. 9 is a flowchart showing the "receiving request from customer for adding service value associated with identifier to customer account" step of FIG. 8 in further detail in accordance with one embodiment of the invention.

FIG. 9 is a flowchart showing the "receiving request from customer for adding service value associated with identifier to customer account" step of FIG. 8 in further detail in accordance with one embodiment of the invention. This flowchart further elaborates step S80A shown in FIG. 8. The flowchart of FIG. 8 follows the same process as described in FIG. 2, above. However, in this embodiment, it is explicitly shown that after the identifier is verified, in step S100, the customer selects a carrier for service from among a plurality of carriers is received, in step S101. The process then proceeds with step S120 as in FIG. 2 when the customer account information is verified.

FIG. 10 is a flowchart showing a method of inserting value and recharging a stored-value account according to the present invention. The steps of this process should be read in conjunction with the other figures, in particular FIG. 1 and its related figures.

In step 1001, the customer selects a card. The customer may select the card from among a plurality of different cards. The cards may be associated with different values and different providers. The cards are associated with one or more prepaid services, such as wireless telecommunications service. For instance, the customer may select a card enabling $40 of wireless telephone service with a particular provider.

In a preferred embodiment, the card has an associated PIN, serial number (in the form of a barcode or a magnetically stored number), and a card number.

The PIN or other numbers may be hidden on the card so that they are not visible until after purchase. For instance, the PIN may have material covering and hiding it, wherein the material may be scratched off with a coin after purchase. Alternately, an opaque adhesive tape may be used to temporarily prevent viewing the PIN until after purchase. These and other methods for securing valuable card information are well-known in the art.

The PIN may be a unique identifier, such as a randomly generated number that is unique to the specific card. The associated barcode number may also be printed on the card so that it can be scanned (or swiped) at a merchant terminal at the point of sale. The use of barcodes and magnetic stripes are well-known in the art. The card number may be another number associated with the card for other purposes. For instance, it may be a provider routing number. It may also be a number printed on the card in accordance with governmental guidelines or other norms.

The card information, such as the PIN number, associated barcode and/or magnetically stored serial number, value, and card number may be stored in a database at the central processor These numbers may be associated together in a single entry for a single stored-value card. By associating them together in a single entry, the central processor may later determine the other associated numbers after receiving a single number, such as the PIN.

These numbers and other indicia may be printed on the card. For instance, the name of the service provider and the value of the card may be printed on the card. The card may also show activation information instructing the customer how to activate the card. Redemption information may comprise a 1-800 number (or other 8xxx number or other phone number), an IVR input code or series of inputs, a website, and or other information or instructions for accessing a central system and/or redeeming the card or otherwise modifying a customer account. The redemption instruction information may be printed on the card, or it may be printed on a receipt and provided to the customer upon purchase of the card.

Different instructions may be associated with different cards. For instance, cards associated with one service provider may have different instructions, such as a different 1-800 number, than a card associated with a different service provider. Different 1-800 numbers, websites, or inputs enable the central processor to distinguish the identity of the provider or other feature of the card based on the method used to access the central system.

In step 1002, the customer purchases the card. The merchant (or customer) scans the card's barcode, swipes the card's magnetic strip, and/or otherwise inputs card information at a terminal, such as a merchant terminal. If the card is not pre-associated with a specific value, the customer may specify a particular value which may then be input at the terminal. This defined value would then become the card's associated value, unless and until the associated value were later changed by the customer, merchant, central processor, or provider.

The merchant terminal transmits this card information to the central processor. The merchant terminal may include other information in the transmission, such as merchant or terminal identification information, other indicia information on the card, or customer information such as name and account number. This transmission may be either a request to activate the card or a request to preauthorize the card (which may then follow with a related authorization request). A preauthorization request may merely query the central processor whether the card is a valid card that is ready to be activated.

In step 1003, the central processor receives information from the merchant terminal. This information may comprise any information input at the terminal as well as any additional information passed from the terminal. In a preferred embodiment, the received information comprises the card's barcode or magnetic strip information. The central processor accesses the database entry corresponding to the card. It may check the status of the card. For instance, it may check whether the card is a valid card that is ready to be activated. It may also verify whether the card has been lost or stolen, or whether there is a database entry corresponding to the card information. It may also check whether the card is associated with the merchant or requesting terminal; for instance, it may check received terminal information against terminal information stored in the card's entry in the database. In a preferred embodiment, the central processor verifies that the terminal is an authorized terminal, such as a trusted source, for making stored-value card requests (or that the communication network used to make the request is a trusted communication network). For instance, if the merchant transmits a merchant identifier along with the card information, the central processor may verify that the merchant identifier is associated with the card information in the database. At this point, the central processor may send a pre-authorization back to the merchant terminal.

At this point, the central processor may preauthorize the card if the transmission from the merchant terminal was a preauthorization request. For instance, the central processor may preauthorize a card that is valid and ready to be issued. It may also make an amendment to the entry to indicate that the card has been preauthorized by a particular terminal. The preauthorization may be passed from the central processor to the merchant terminal. At this point, the card has not been purchased.

The merchant terminal may then receive the preauthorization and allow the customer to proceed with the purchase. For instance, the merchant terminal may collect funds from the customer, e.g., in a credit card or cash transaction. Before, during, or after this time (such as when the customer's funds have cleared or after), the merchant terminal may then send an authorization/activation request to the central processor The central processor may receive the authorization request, which may include card information and merchant or terminal information (as described herein), and process the information.

The central processor may then amend the stored-value card entry corresponding to the received card information. The central processor may then activate and/or register the card. For example, the central processor may amend the entry to show that the card has been registered and/or activated. By activating and/or registering the card, the central processor acknowledges that the card has been properly purchased at a merchant terminal. When the customer later attempts to redeem the card and/or add value to a customer account (or otherwise amend a customer account), the central processor may deny the request if the card has not been validly issued or activated. This prevents theft of the cards, because a stolen card cannot be activated. The central processor may send a transaction confirmation to the merchant terminal, which may pass a confirmation to the customer. In some cases, the authorization will occur long after the preauthorization (such as after a check clears), so a confirmation will not be passed to the customer.

If a PIN is not pre-printed on the card, the central processor may also transmit a PIN to the merchant terminal upon activation of the card. The merchant terminal may then distribute the PIN to the customer, such as on a printed receipt. The central processor would then associate the PIN with the card, for example by storing the PIN in the card entry (or vice versa).

A preauthorization step is advantageous for theft and loss prevention. Without a preauthorization step, it was possible to redeem a card before paying for it. For instance, the card could be redeemed during the delay between when the card is processed (e.g., scanned and activated) and when the card is paid for (either by the merchant or by the customer). The delay may comprise the time it takes for a credit card or check to be processed, or it may comprise the time at the checkout counter between when the card is scanned and the time the customer is actually charged. However, only an activated/authorized card can be redeemed, not a preauthorized card. By doing a preauthorization at the time of scanning (or otherwise inputting card information at the merchant terminal), users cannot exploit this delay for illicit purposes. Then, when the card is activated, the funds may already be transferred, so the customer may not redeem value that has not been properly purchased.

It should be appreciated that steps 1002 and 1003 may involve back-and-forth communication between the merchant terminal and the central processor, including preauthorization and authorization/activation requests and responses.

In step 1004, the customer accesses the central processor system. For instance, the customer may access the central processor to request to redeem the associated value. The central processor may comprise an IVR phone system or a central website associated with the central processor. The central processor system may also comprise any other means for communication between a customer and a central system known in the art. For purposes of the description herein, the central IVR and central website may be considered part of the general central processor system, along with the central processor database.

In optional step 1005, the central system prompts the customer for information. The prompt may be an IVR prompt or instructions on a website, such as an input field on a website. The prompt may comprise any query by the central processor requesting information from the customer. The prompt may ask for any information associated with the card, the service, or the customer, such as the PIN, associated value, and customer name, phone number or account number. For instance, the customer may be prompted for the identity of the provider. This and other information may also be automatically determined as described herein.

In step 1006, the customer provides information to the central system, such as by responding to the prompts. In a preferred embodiment, the customer provides the card's PIN number as well as the customer's account number or phone number.

In step 1007, the central processor identifies the service provider associated with the customer account and the customer account number. The central processor may also identify other information such as the serial number, other card indicia, value, customer name, address, social security number, or other customer or account information. This information may be identified based on customer input.

Some of the information may be automatically determined by the central system. This information therefore does not require prompts or customer input. For wireless telecommunication service, the account number may be the customer's mobile phone number or mobile identification number (MIN). Identification information such as a MIN may be ascertained by automatic number identification (ANI). For instance, if the customer calls an 800 number from the customer's wireless telephone, the central system may identify the account associated with the wireless telephone number. For telephone long distance service, the central system may similarly identify an account associated with the telephone number.

The identity of the provider may also be determined automatically For instance, as described above, the provider may be identified by the manner in which the customer accesses the central system. For instance, a particular 1-800 number (or similar number) may be associated with a particular provider. Thus, when the central system receives a call from a customer at that number, it may automatically determine that a customer's account must be associated with the particular provider.

The information received and identified by the central processor may be stored in a database, such as in the database entry for the associated card, where the different items of information are associated together. One piece of identifying information associated with the card may enable the central processor to identify other associated card or account information stored in the database entry.

It should be understood that steps 1005-1007 may involve back-and-forth communication between the customer and central system, and they may therefore overlap and occur over the same time period.

In step 1008, the central processor inserts value information into the provider's system. If the customer's account can be modified directly by the central system, then the central system amends the customer's account and adds the value. For instance, the central processor may be the provider or an affiliate of the provider and accordingly have managerial control over the accounts. In this case, it may add value to the accounts directly.

It may also store amended account information, account history information, and other account information according to well-known methods in the art.

If the customer's account cannot be modified directly by the central system, then the central processor may "insert value" by passing value insertion information to the provider's system to enable the provider's system to process the customer's request to add value. In a preferred embodiment, this information comprises the customer account and the associated value. For example, the information may instruct the provider to add a certain amount (the associated value) to a specific account (the customer's account).

In order to pass the information to the provider, the central processor may access a database of the provider, wherein the provider database stores stored-value account information for user accounts associated with the provider, such as wireless service accounts. The central processor may also access the provider's website or other computer interface.

In one embodiment, the central processor uses an internet protocol and/or file transfer protocol to transfer stored-value card and/or PIN data of the user. For instance, the central processor may send an xml request to the provider's computer platform. Alternately, the request may be via email, ftp, or other means. The request may conform to the provider's application programming interface (API) or other formatting requirements. The request may comprise accessing a provider's IVR system or website and or inputting information at prompts from the provider system. The processor may make any appropriate inputs to add value to a customer's stored-value account. The central processor may pass PIN and/or other account-related information to the provider (and/or its database), such as a PIN, user name, address, account number, wireless telephone number, password, or other information For instance, the central processor may instruct the provider to add a certain amount to a user's stored-value account.

In step 1009, the provider adds the associated value to the customer account. This step is not necessary if value has already been added to the customer account in step 1008, such as if the central system manages the customer's account directly.

The third-party provider may first receive information from the central processor passed in step 1008. To add value, the provider may amend its customer account records (such as those stored in a database) to reflect the passed information, such as an increased value in a customer account. The provider may also send a transaction confirmation to the central processor via similar communication means, such as via xml. The confirmation may confirm that the PIN-related transaction was (or was not) completed successfully.

After value is added to (or inserted into) the account, the processor and or provider may provide a transaction confirmation to the customer. The confirmation may comprise a positive or negative response, a new account balance, or other account- or card-related information. A negative response may result when the carrier doesn't recognize the account, the customer's account has been deactivated, the account has been suspended, or when other negative or questionable circumstances are present.

In step 1010, the customer uses the same stored-value card in a subsequent transaction. For instance, the card may be scanned or swiped at a second merchant terminal, and it may proceed in a manner similar to step 1002. I.e., the merchant may input card information and transmit information to the central processor. This terminal may or may not be the same as the first terminal, and it may be located at a different merchant's store.

Alternately, the central processor may receive card information over the internet, email, phone (e.g., IVR), or other communication means. For instance, a customer may log onto a website associated with the central processor and input card information, such as the card number or PIN. The customer may use any means for communicating with central processor, including a phone, PDA, computer, or other means.

In one embodiment, a different associated value may be specified for each subsequent transaction. For instance, a customer may enter the value at an input field on a website, or the merchant may input the new value into the merchant terminal before or after inputting the card information.

In another embodiment, a different provider may also be specified (e.g., by the customer) for each transaction.

In step 1011, the central processor receives card information. Based on this information, the central processor may automatically "recharge" the card by causing the associated value into the customer's account.

This may occur in a manner similar to step 1003. The information may be received pursuant to a second request to activate the card or to otherwise process card information. The second request may be from a second merchant terminal, which may be associated with a different merchant. The second request may also be from the same merchant terminal. The request may also be from a any source that may communicate with the central processor, such as a computer, PDA, telephone or other device.

The central processor may then determine whether an account number and provider have been previously identified for the card associated with the received card information. For instance, the processor may access the card's record in the database and determine whether the entry includes an identified provider and account number. Because this account has already registered/activated above, and because the account and card information have already been stored, the central processor recognizes that this is an active card. For instance, the central processor may receive the barcode serial number or other identifier from the merchant terminal, and it may access the appropriate database entry and determine that the account is activated.

Here, the account is already associated with a provider and account number (and value, in a preferred embodiment) because the central processor has already identified and stored such information during a prior transaction. There is no need for the extra step of 1006, wherein the customer accesses the central system directly to make a redemption request. Thus, the central processor automatically inserts the value into the customer's account, as described above for step 1008.

Step 1011 describes the process when a previously-processed card is used for a subsequent transaction. If a card has never been used for a transaction (and consequently the provider and account number have never been identified), the process would begin from step 1001. It should be noted that each time card information is transmitted from a merchant terminal (or other source) to the central processor, the processor may check to determine whether the card is already associated with an account number and provider. If it has been, the processor may automatically complete the transaction, such as by passing a request to add value to the provider or otherwise adding or inserting value into the customer's account.

In step 1012, the central processor optionally sends a confirmation to the merchant terminal, and the merchant terminal provides the confirmation to the customer.

Additional activation requests may be made for the card. For instance, after purchasing a card from a merchant terminal and activating the card, the customer may recharge the value of the card any number of times at any number of merchant terminals, including the same merchant terminal (s). The customer may also recharge the card via the internet or telephone. The customer may also specify various parameters during recharge, such as a new associated value, new provider, and new PIN (or other identifier).

It should be appreciated that the central processor may be a computer system of a provider, or it may be a separate system. For instance, the central processor may itself be a wireless carrier's computer system, wherein the carrier provides and redeems wireless PINs for customers Alternately, it may be a system that is not directly affiliated with any wireless carrier, in which case it may merely serve as a centralized system.

The central processor may offer special deals and promotions to customers based on this information. For instance, the central processor may make offers or give awards or advantages to customers based on the number (or value, or total value) of cards or PINs they purchase and or process.

It should be understood that a service provider may be any provider of any product and/or service. It should also be understood that the service may be any product or service.

It will be understood that the specific embodiments of the invention shown and described herein is exemplary only. Numerous variations, changes, substitutions and equivalents will now occur to those skilled in the art without departing from the spirit and scope of the present invention. Accordingly, it is intended that all subject matter described herein and shown in the accompanying drawings be regarded as illustrative only and not in a limiting sense and that the scope of the invention be solely determined by the appended claims.

What is claimed is:

1. A method of processing a stored-value card request, comprising:
    distributing a stored-value card to a first merchant for distribution to a customer having a pre-paid account with a specific provider other than the first merchant, the stored-value card having an associated identifier used to associate a stored value with the card, the stored value being redeemable with one or more providers, including the specific provider, the pre-paid account having an associated account number, stored-value card having an indication of the providers with which the stored value may be redeemed disposed visibly thereon;
    receiving at a central processor a first request to activate the card from a first merchant terminal, the first request resulting from a purchase of the card, wherein the central processor is in selective communication with the first merchant terminal, the customer, and the one or more providers;
    associating the stored value with the identifier;
    distributing the stored-value card to the customer;
    receiving at the central processor over a private network a redemption request from the customer to apply the stored value to the pre-paid account, wherein the redemption request comprises the identifier;
    determining at the central processor the specific provider and the pre-paid account number based on the redemption request;
    receiving at the central processor a verification response from the customer that the correct specific provider and pre-paid account number has been determined;
    passing from the central processor to the specific provider a first request to apply the stored value to the pre-paid account with the specific provider; and
    applying the stored value to the pre-paid customer account with the specific provider.

2. The method of claim 1, wherein the stored-value card is associated with the specific provider prior to receiving the first activation request.

3. The method of claim 1, further comprising:
    prior to receiving the first activation request:
        receiving at the central processor a request for a card preauthorization confirmation from the first merchant terminal; and
        passing from the central processor the card preauthorization confirmation to the first merchant terminal.

4. The method of claim 1, further comprising:
    passing from the central processor an activation confirmation to the first merchant terminal.

5. The method of claim 1, further comprising:
    receiving at the central processor a value insertion confirmation from the provider; and
    passing from the central processor to the customer confirmation information indicating that the associated value was added to the account.

6. The method of claim 1, wherein the card comprises machine readable data, selected from the group consisting of a two dimensional barcode, a three dimensional bar code, and a magnetic strip.

7. The method of claim 1, wherein the redemption request is received from a customer phone number, and the account number is identified by identifying the customer phone number using an automatic identification number (ANI) process.

8. The method of claim 1, further comprising:
    determining at the central processor whether the first merchant terminal is a trusted source of activation requests or whether the first activation request was received over a trusted communication network; and
    activating the card at the central processor.

9. The method of claim 1, further comprising:
    determining at the central processor whether the first merchant terminal is associated with the card; and
    activating at the central processor the card based on the determining action.

10. The method of claim 1, wherein the identifier is a PIN.

11. The method of claim 1, wherein the identifier is associated with the specific provider.

12. The method of cairn 1, further comprising:
    determining at the central processor whether to activate the card based on receiving the first activation request.

13. The method of claim 12, further comprising:
    associating the associated stored value with the identifier and passing from the central processor an activation confirmation to the first merchant terminal after a determination to activate the card.

14. The method of claim 1, further comprising:
    associating at the central processor the provider and the account number with the identifier in a record.

15. The method of claim 14, further comprising:
    receiving a second request to activate the card at the central processor;
    identifying at the central processor the account number and the provider by processing the record based on receiving the second request; and passing a second request to process the associated stored value from the central processor to the provider.

16. The method of claim 15, further comprising:
determining at the central processor whether the account number and the provider have been previously identified based on receiving the second request.

17. The method of claim 15, wherein the second request to process the associated stored value comprises adding the associated stored value to the account.

18. The method of claim 15, wherein the second activation request is received from a second merchant terminal.

19. A method of processing a stored-value card request, comprising:
distributing a stored-value card to a first merchant for distribution to a customer having a pre-paid account with a specific provider other than the first merchant, the stored-value card having an associated identifier used to associate a stored value with the card, the stored value being redeemable with one or more providers, including the specific provider, the pre-pad account having an associated account number, the stored value card having an indication of the providers with which the stored value may be redeemed disposed visibly thereon;
receiving at a central processor a first request to activate the card from a first merchant terminal, the first request resulting from a purchase of the card, and the central processor being in selective communication with the first merchant terminal, the customer, and the one or more providers;
associating the stored value with the identifier;
distributing the stored-value card to the customer;
receiving at the central processor over a private network a redemption request from the customer to apply the stored value to the pre-paid account, wherein the redemption request comprises the identifier;
determining at the central processor the specific provider and the pre-paid account number based on the redemption request;
receiving at the central processor a verification response from the customer that the correct specific provider and pre-paid account number has been determined;
associating at the central processor the specific provider and the pre-paid account number with the identifier in a record;
applying at the central processor the stored value to the pre-paid account based on the redemption request;
receiving at the central processor a second request to activate the card over a private network; and
applying the stored value from the central processor to the pre-paid account based on the second activation request.

20. A method of processing a stored-value card request, comprising:
distributing a stored-value card to a first merchant for distribution to a customer having a pre-paid account with a specific provider other than the first merchant, the account having an associated account number;
receiving at a central processor a first request to activate the card from a first merchant terminal, the first request resulting from a purchase of the card, wherein the central processor is in selective communication with the first merchant terminal, the customer, and the specific provider;
passing an identifier from the central processor to the first merchant terminal for distribution to the customer, the identifier being associated with the card and operative to associate a stored value with the card, the stored value being redeemable with one or more providers, including the specific provider, the stored value card having an indication of the providers with which the stored value may be redeemed disposed visibly thereon;
associating the stored value with the identifier;
distributing the identifier to the customer;
receiving at the central processor over a private network a redemption request from the customer to apply the stored value to the pre-paid account, wherein the redemption request comprises the identifier;
determining at the central processor the specific provider and the pre-paid account number based on the redemption request;
receiving at the central processor a verification response from the customer that the correct specific provider and pre-paid account number has been determined;
passing from the central processor a first request to apply the stored value to the specific provider; and
applying the stored value to pre-paid customer account with the specific provider.

* * * * *